United States Patent [19]

Miyazawa

[11] Patent Number: 5,731,794
[45] Date of Patent: Mar. 24, 1998

[54] COLOR PANEL DISPLAY DEVICE

[75] Inventor: Kuniaki Miyazawa, Saitama, Japan

[73] Assignees: Kazuo Aoki, Tokyo; Yasuaki Gomi, Kanagawa, both of Japan

[21] Appl. No.: 390,580

[22] Filed: Feb. 17, 1995

[30] Foreign Application Priority Data

Feb. 17, 1994 [JP] Japan .................. 6-045105
Jun. 15, 1994 [JP] Japan .................. 6-156816

[51] Int. Cl.$^6$ .................. G09G 3/36; H04N 9/30
[52] U.S. Cl. .................. 345/88; 345/102; 345/202; 348/791
[58] Field of Search .................. 345/88, 98, 102, 345/154, 202; 348/268, 272, 790, 791, 752, 14; 359/48; H04N 9/30

[56] References Cited

U.S. PATENT DOCUMENTS

| | | | |
|---|---|---|---|
| 4,907,862 | 3/1990 | Suntola | 359/48 |
| 5,011,269 | 4/1991 | Wakita et al. | 345/89 |
| 5,124,688 | 6/1992 | Rumball | 345/154 |
| 5,159,445 | 10/1992 | Gidin et al. | 348/14 |

FOREIGN PATENT DOCUMENTS 4-338996 11/1992 Japan .
5-191787 7/1993 Japan .
5-270063 10/1993 Japan .

*Primary Examiner*—Andrew Faile
*Assistant Examiner*—Andrew B. Christensen

[57] ABSTRACT

A three-color backlight type display device according to the present invention is provided for reproducing a full color image with no use of color filters. In use, a composite signal is separated by a RGB decoder into R, G, and B color components which are sampled on a frame-by-frame basis and stored as a serial RGB data into a RAM. The color components of the serial data are read from the RAM with a delay of one frame after the write time and within a shorter duration for data compression. The color components of compressed form are transmitted to an LCD where each of them is allocated to form a dot pattern during a blanking period. In synchronization with the allocation of the color component, a corresponding one of the three backlights is irradiated. This action is repeated for all the R, G, and B components in a succession. Accordingly, a clear color image can be reproduced having less unwanted artifacts, e.g. color blur and persistence, which are attributed to any conventional three-color backlight type display.

22 Claims, 9 Drawing Sheets

COLOR PANEL DISPLAY DEVICE

BACKGROUND OF THE INVENTION

The present invention relates to a color display device and more particularly, to a color panel display device which comprises a display having an array of pixels arranged variable in the transparency according to video data and backlight sources of R, G, and B colors responsive to the video data for turning on and off individually.

While television receivers and OA machines including microcomputers have been reduced in size and weight, it is substantially desired to minimize their displays. For the purpose, a variety of flat-panel displays including liquid crystal displays (LCD) and magnetic fluid displays (e.g. those developed by us as depicted in Japanese Patent Applications 5-191787 and 5-270063 (1993)) are introduced to substitute for known CRT displays.

Figure 11:
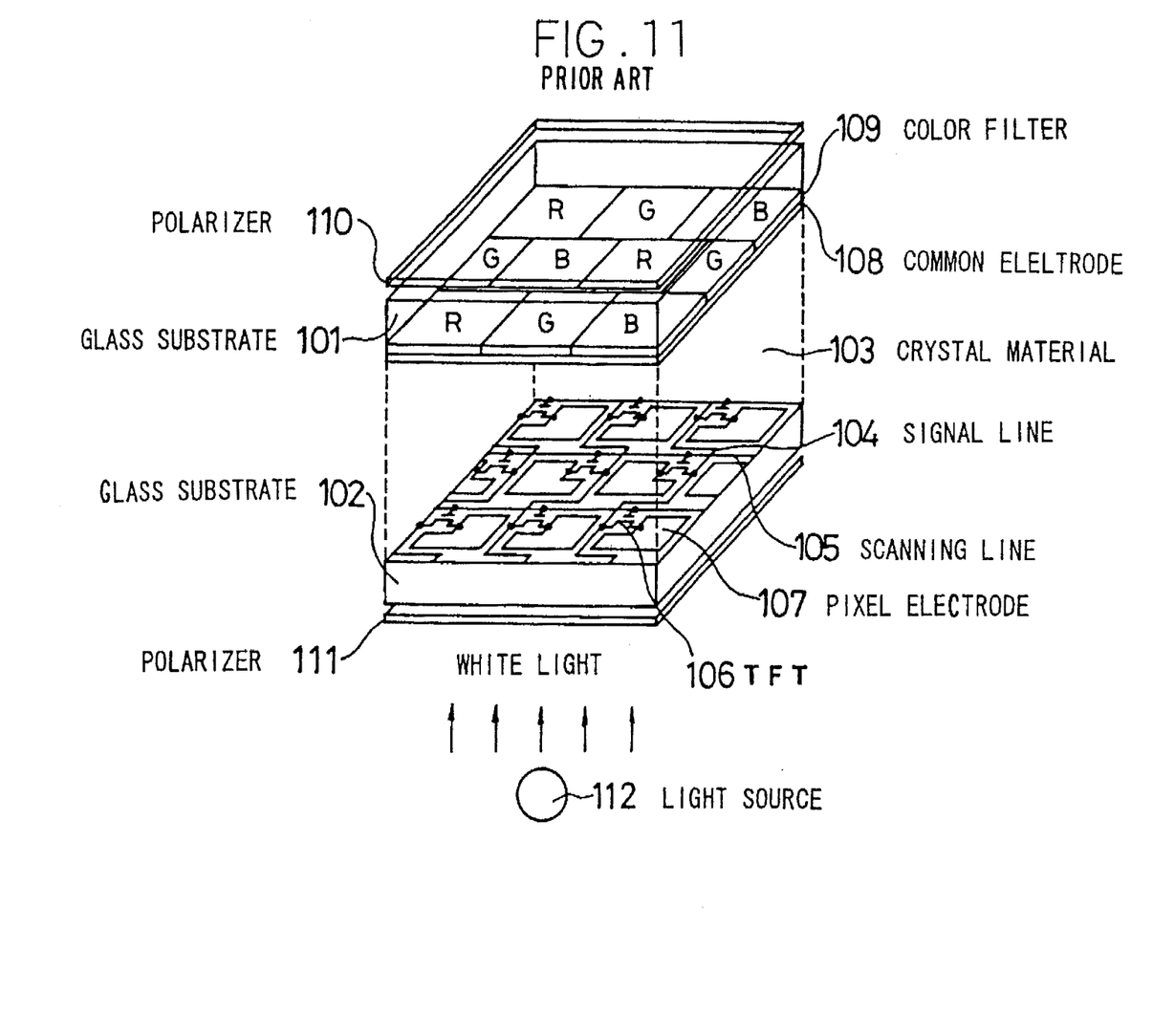
FIG. 11 is a schematic view of a conventional color filter type display panel device.

One of the basic technical requirements for such flat-panel displays is to reproduce a full color image with quality. As shown in FIG. 11, a common TFT type color LCD display comprises two glass substrates 101 and 102 fixedly disposed opposite to each other by a distance of a few micrometers and a liquid crystal material 103 filling between the two glass substrates 101 and 102. Rows of signal lines 104 and scanning lines 105 are wired in a matrix form on the lower glass substrate 102 in which each intersection is connected between a TFT 106 and a transparent pixel electrode 107. Also, a common electrode 108 and a color filter 109 are mounted to the upper glass substrate 101. The TFT-LCD assembly is arranged between two polarizers 110 and 111 so that it can be irradiated by an intensity of backlight from a white light source 112, thus constituting a transmission type display device. The color filter 109 consists of three primary colors; R(red), G(green), and B(blue) assigned to the corresponding pixel electrodes 107. In action, when a red color light is wanted for color reproduction at the pixel, the R region of the filter 109 is turned to transparent and the other G and B regions remain opaque.

Conventional color panel displays of the foregoing color filter type have widely been utilized and are capable of reproducing a full color image of quality without awful difficulty. They however have a disadvantage that a matrix of the pixel electrodes disposed throughout the three, R, G, and B, regions has to be elaborated at higher precision to reproduce an image with high resolution. In addition, among other disadvantages to be overcome are that a great number of drivers are needed, that the transparency of the color filter has to be increased, and that the adjustment of color balance is not so simple as designed.

A modification of the conventional display is provided as disclosed in Japanese Patent Laid-open Publication 4-338996 (1992), in which three, R, G, and B, backlight sources are arranged to illuminate at given timings while color signals synchronized with the timings are fed to each target pixel for reproducing a full color image. Thus, the modified display is called three-color backlight type color panel display.

The three-color backlight type color panel display operates at equal intervals of a frame a sequence of simple illuminating actions in which a target pixel is supplied with an R color signal upon the R light source being turned on, a G signal on the G light source turned on, and a B signal on the B light source turned on. Because the response of a liquid crystal material to the color signals is as slow as some tens to hundreds milliseconds, the G light source may, for example, be turned on before the pixel supplied with the R signal has fully been canceled causing a mixture of R and G colors. As the result, undesired artifacts including color blur and persistence will appear, diminishing the quality of a reproduced image. If the blanking period is provided to eliminate such artifacts, its continuation will result in deterioration of the image quality.

It is an object of the present invention, for overcoming the foregoing disadvantages of the conventional color panel displays of the three-color backlight type, to provide a novel, improved three-color backlight type color panel display device capable of exploiting the performance of the three-color backlight type which reproduces a high resolution color image with the use of no color filters but a less number of drivers and simultaneously, eliminating undesired artifacts, e.g. color blur and persistence, which are inherent in the three-color backlight type, by minimizing the blanking period.

SUMMARY OF THE INVENTION

A display apparatus which has a display provided with an array of pixels arranged variable in the transparency according to a video data and three, R, G, and B, backlight sources responsive to the video data for turning on and off individually, comprises a video data converting means for converting the video data on a frame-by-frame basis to a serial data of three, R, G, and B, color components, a memory means for storing the R, G, and B components of the serial data separately, a data compressing means for compressing the R, G, and B components of the serial data upon reading from the memory means, a data bus means for transmitting the R, G, and B components of compressed data form in a succession of the frames to produce a pixel pattern on the pixel array, and a control means for controlling the turning on and off of three backlight sources in accordance with the pixel pattern of the compressed data.

In an action of the display apparatus, a video signal such as an NTSC signal is separated by the video data converting means to R, G, and B color components which are composed in frames. The color components are separately stored in the memory means and compressed by the data compressing means. The R, G, and B components of compressed form are transmitted on a frame-by-frame basis to the pixel array and in synchronization with the transmission, the R, G, and B backlight sources are turned on so that the three components are not overlapped with one another in a sequence of the frames. More specifically, a sequence of steps are executed to reproduce a full color image in which the R backlight source is turned on for one frame in response to transmission and display of the R component of compressed form, the G backlight source is then turned on for one frame in response to transmission and display of the G component, and the B backlight source is finally turned on for one frame in response to transmission and display of the B component of compressed form. According to the present invention, one frame (e.g. 16 ms) of each color component is compressed to a smaller duration data (e.g. 2.6 ms) which is then transferred to the pixel array for activation of corresponding pixels. A resultant pixel pattern of the color component is thus reproduced within a shorter time. In synchronization with the timing of transmitting the color component to the pixel array, the corresponding color backlight source is turned on so that a duration of the frame required for transmission of the color component (a pixel data write time) serves as a blanking time while the remaining duration is a hold time (e.g. 13.4 ms) for illumination of the pixel array. This permits the color components of video data to be displayed as a full color image on the monochromatic array of pixels with the use of no color filters. The pixel pattern of each color component appearing during the hold period is maintained by the memory effect of a liquid crystal material and will gradually be declined. It is hence possible to shift from one color component to another color component quickly and reduce unwanted artifacts of color blur and persistence which are attributed to the conventional three-color backlight type of a panel display. As the result, a clear full color image of quality can be reproduced.

The color panel display device of the present invention may further comprise a reset means for shortening a hold period of the pixel pattern. As the hold time of the pixel pattern is decreased with the reset means, the pixel pattern is maintain by the memory effect of the liquid crystal material in each pixel and will gradually be declined. This allows the color component to be quickly shifted to another color component for display upon starting a reset action of the reset means. Accordingly, a clear, full color image will be reproduced without the unwanted artifacts of color blur and persistence which are inherent in the conventional three-color backlight type of the display.

The reset memos may be arranged to turn to a reset state with a delay of time after the start of holding a transparency of the pixel pattern. This permits the decreasing of the hold time of the pixel pattern to be adjusted and also, the declination of the transparency of the pixel pattern to be advanced.

The reset means may also be arranged so that its reset state is terminated a given period earlier than the start of holding a transparency of a succeeding pixel pattern. As the reset state of the reset means is terminated earlier than the start of holding the transparency of the succeeding pixel pattern, a start condition of the transparency of the pixel pattern is prevented from serious interruption of a preceding pixel pattern.

The reset means may further be arranged so that its reset state is terminated just before the introduction of a succeeding vertical sync signal. As the reset state of the reset means is terminated before the introduction of the succeeding vertical sync signal, it can be effected at optimum even if its response speed is varied by a change in external condition such as temperature.

The backlight sources may be arranged to turn on upon the pixel pattern having a maximum transparency. This allows the backlight sources to be selectively energized at higher efficiency contributing to the energy saving.

The backlight sources may be arranged to turn off a given period earlier than the introduction of a succeeding vertical sync signal which follows the turning on of the backlight sources. This also permits efficient illumination of the backlight sources thus contributing to the energy saving. By using a reset action, the backlight sources can be prevented from illuminating during an unwanted period.

The data compressing means may be replaced with an extra function added to the data bus means for reading the serial data of the R, G, and B components from the memory at a faster speed than the speed of writing the same into the memory means. As the result, data of one frame of the color component is read and transmitted to the pixel array during the blanking period which is shorter than the entire length of the frame. In other words, the same effect as of the previous arrangement depicted in claim 1 can be obtained with a simpler arrangement.

Furthermore, a sampling means may be provided for sampling the R, G, and B components of the serial data on the frame-by-frame basis so that the three frames of their respective color components of the serial data are not overlapped with one another on a time base when being stored in the memory means. Accordingly, for example, an action of reading the R component from the memory is synchronized with an action of writing the G component into the memory. This allows the blanking time and the hold time to fall in the length of the frame without difficulty.

The memory means may comprise a first RAM and a second RAM. Accordingly, an action of reading as compressed data in the blanking period, for example, one frame of the R component from the first RAM is synchronized with an action of writing one frame of the G component into the second RAM. This pair of the actions are followed by the synchronization of an action of reading as compressed data in a succeeding blanking period one frame of the G component from the second RAM with an action of writing a frame of the B component into the first RAM. By repeating those actions, the frame defined by the blanking time and the hold time can easily be accessed.

DESCRIPTION OF THE PREFERRED EMBODIMENTS

Preferred embodiments of the present invention will be described in the form of a color panel display device referring to the accompanying drawings..

Figure 1:
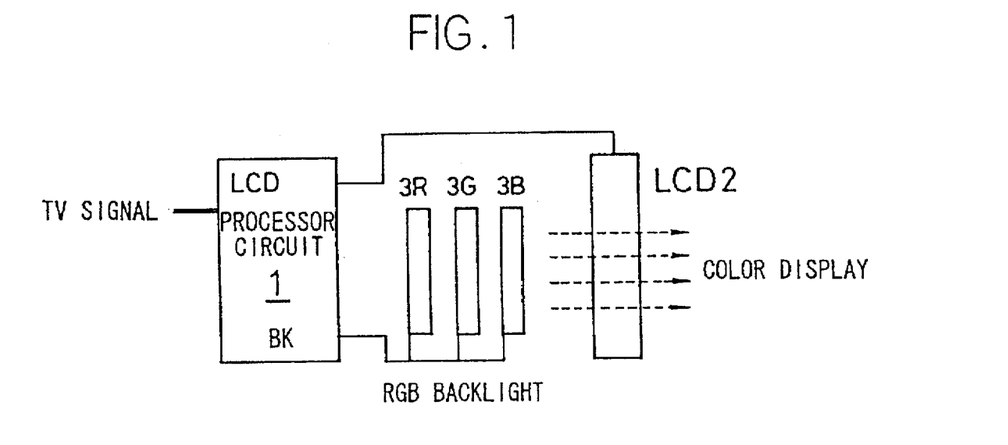
FIG. 1 is a schematic view of an embodiment of a color panel display device according to the present invention.

As shown in FIG. 1, the color panel display device of the present invention comprises a signal processor circuit 1 for receiving and processing a composite TV signal of video data in the existing NTSC, PAL, or SECAM format, a liquid crystal display 2 (LCD) responsive to LCD signals from the processor circuit 1 for actuating corresponding pixels to reproduce an image of the video data, and three light sources 3R, 3G, and 3B responsive to corresponding backlight signals from the processor circuit 1 for performing on and off actions separately to emit their respective R, G, and B colors of light. The LCD 2 may be of a conventional type in which a liquid crystal material filled between two glass plates is controlled for orientation by a matrix form of pixel electrodes. The backlight sources 3R, 3G, and 3B may be selected from fluorescent lamps, white light lamps, electroluminescent lamps, light emitting diodes (LCD), and metal halide lamps. It is however understood that the backlight sources are not limited to those lamps and any other devices will be used which are responsive to the BK signals for conducting on and off actions individually to emit R, G, and B colors of light.

Figure 2:
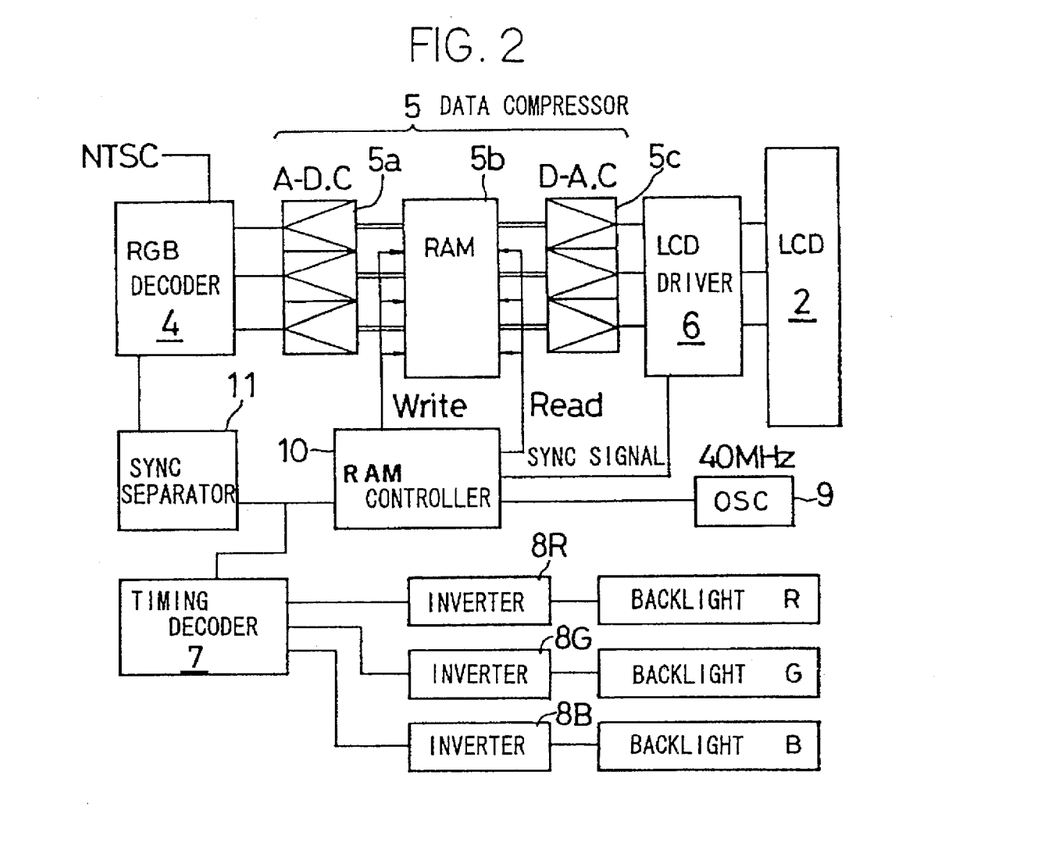
FIG. 2 is a circuitry diagram of the color panel display device of the embodiment.

A control circuit of the device of FIG. 1 for display of a full color image comprises a video signal processor for processing is composed mainly of signals of video data, a three-color backlight controller, and a sync controller. As shown in FIG. 2, the video signal processor comprises an RGB decoder 4 for separating R, G, and B color components from a composite signal (e.g. of the NTSC format), a data compressor 5 for compressing data of the color components, and an LCD driver 6. The three-color backlight controller comprises a timing decoder 7 and an inverter 8. The sync controller comprises an oscillator 9 for producing e.g. 40 MHz, a RAM controller 10, and a sync separator 11. The data compressor 5 includes an A/D converter 5a for A/D conversion of the R, B, and G color components, a RAM 5b, and a D/A converter 5c.

Figure 3:
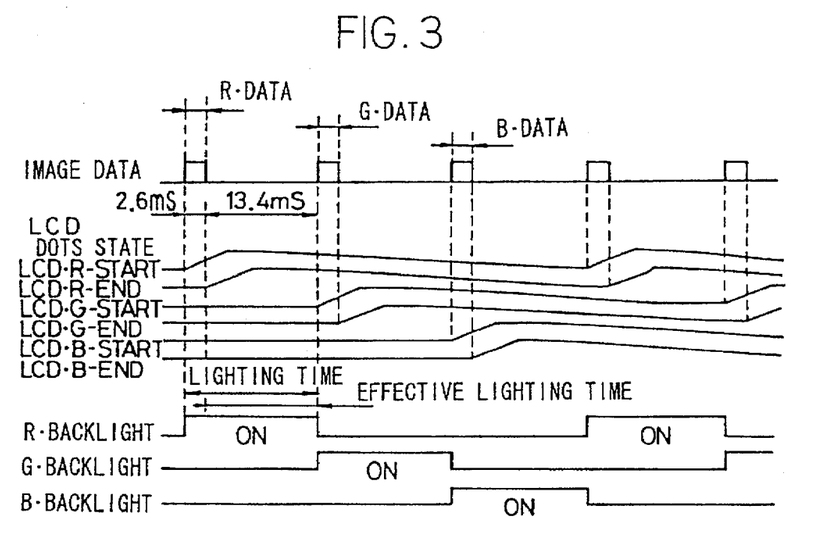
FIG. 3 is an explanatory view showing an action of the color panel display device illustrated in FIGS. 1 and 2.
Figure 4:
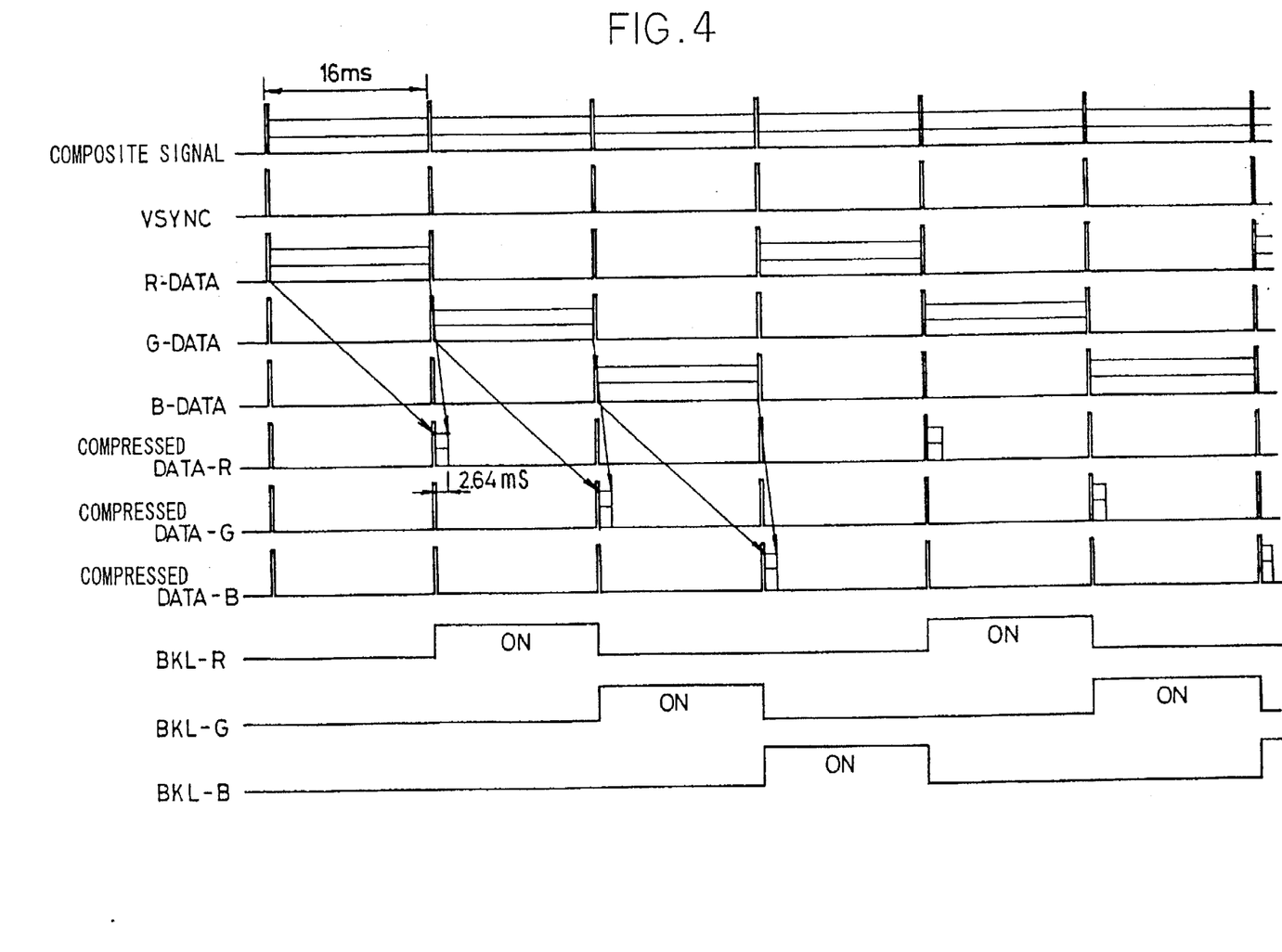
FIG. 4 is a timing chart showing signal waveforms of the color panel display device illustrated in FIGS. 1 and 2.

The action of the color panel display device shown in FIGS. 1 and 2 will now be explained referring to FIGS. 3 and 4.

The composite signal of image data, e.g. a TV signal, is separated by the RGB decoder into three, R, G, and B, color components which are then subjected to A/D conversion of the A/D converter 5a. According to a V-SYNC signal, three converted components are loaded on a frame-by-frame basis (at equal intervals of 16 ms) into the RAM 5b for storage. More specifically, the recording of each set of the R, G, and B color components takes at least three frames or 48 milliseconds. Real data of the R, G, and B components stored in the RAM 5b are then retrieved for 25 ns (2.63 ms for each frame) at the timing synchronized with the V-SYNC signal and subjected to D/A conversion of the D/A converter 5c. Three D/A converted components are fed to the LCD driver 6 which in turn actuates the LCD panel to reproduce corresponding colors of the image data.

According to the present invention, the timing decoder 7 is actuated at intervals of 16 ms by the timing of the V-SYNC signal synchronized with frames to turn on the R, G, and B backlight sources. As the result, the LCD panel with monochrome tone displays a spurious color image.

The above action will be described in more details referring to the timing chart of FIG. 4. For example, one frame (16 ms) of the R color component is separated from the R, G, and B color composite signal by the timing synchronous with the V-SYNC signal and stored in the RAM 5b. As the R light source 3R is energized by the timing synchronous with the transmission of the R component to the LCD driver, the readout duration (2.6 ms) of the R component of the frame is used as a blanking period and the remaining duration (13.4 ms) is assigned as a hold period. While a dot pattern of the image produced on the display panel during the blanking period (which extends from LCD-R-START signal to LCD-R-END signal as shown in FIG. 3) is canceled by the LCD-R-END signal, a group of transparent dots on the display panel determined by the R component are not sharply declined but maintained by the memory effect of the liquid crystal material and simultaneously, illuminated by the R light source for display. When the next frame starts for activating the G color component, the transparent dots for the R component have completely been decayed allowing a quick changeover to display of the G component. Hence, unwanted artifacts such as color blur and persistence can be minimized. The G component is accessed during the frame of displaying the R component. The R component is ignored during the time of accessing the G and B color components. In this manner, the three, R, G, and B, color components are visualized in a succession with their respective light sources turned on in synchronization thus creating on the monochromatic LCD display panel a full color image without color blur and persistence.

Figure 5:
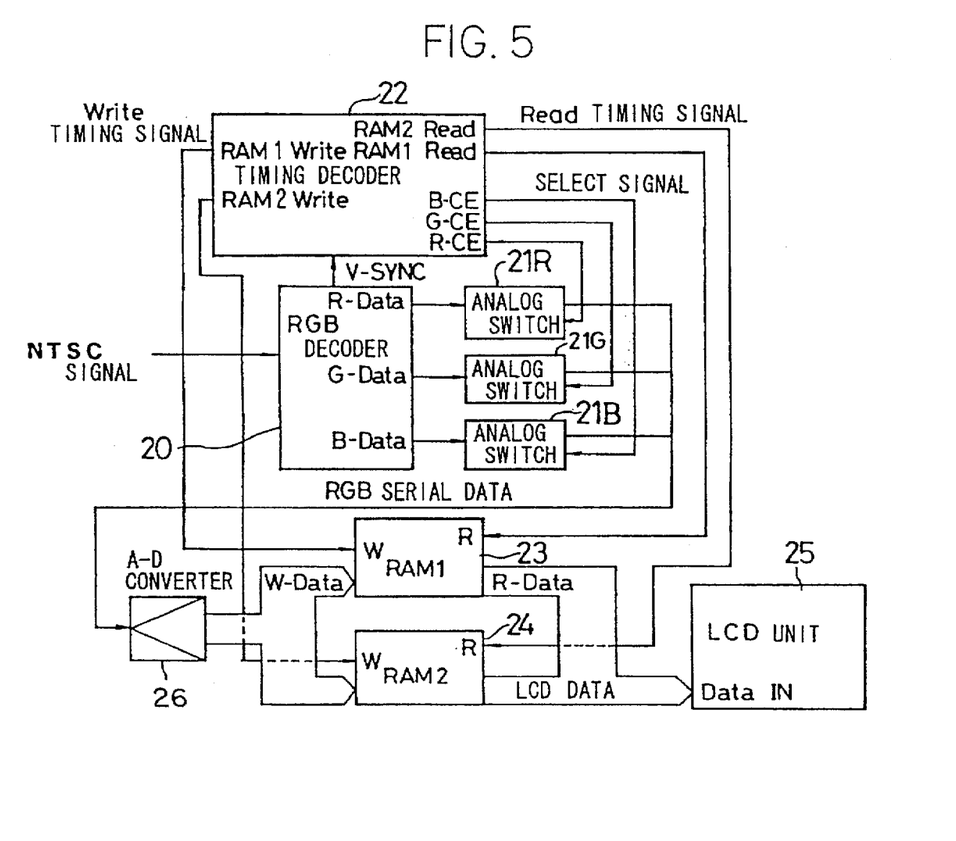
FIG. 5 is a circuitry diagram of another embodiment of the color panel display device according to the present invention.
Figure 6:
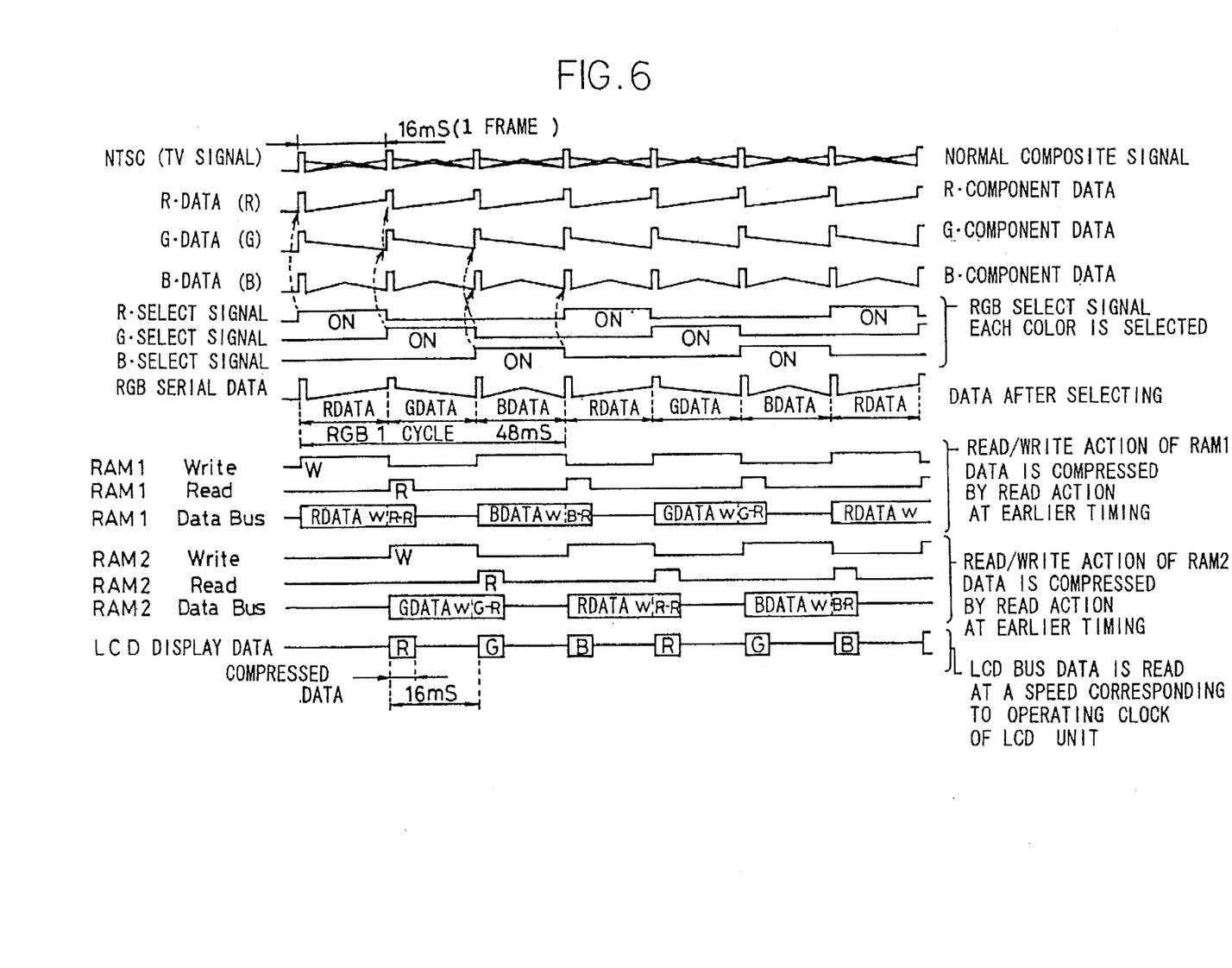
FIG. 6 is a timing chart showing signal waveforms of the color panel display device illustrated in FIG. 5.

FIGS. 5 and 6 illustrate another embodiment of the color display device according to the present invention. A control circuit shown in FIG. 5 is substantially similar to the circuit shown in FIG. 2 but is distinguished by the fact that the RAM comprises a first RAM and a second RAM for ease of shifting from one to another of the R, G, and B color components.

A composite signal of video data, e.g. an NTSC signal, is separated by an RGB decoder 20 into three, R, G, and B, color components which are transferred in serial link to analog switches 21R, 21G, and 21B respectively. The RGB decoder 20 also transmits a V-SYNC signal to a timing decoder 22 which in turn produces and sends three select signals to their respective analog switches 21R, 21G, and 21B for sampling the R, G, and B color components in a succession on a frame-by-frame basis. As the result, an RGB serial data is produced in which one cycle period comprises three frames (48 ms) of the R, G, and B (16 ms frame) components. The frames of the RGB serial data are then A/D converted by an A/D converter 26 and alternately stored into the first and second RAMs 23, 24 according to a timing signal from the timing decoder 22. Desired frames of the RGB serial data are then retrieved from the first and second RAMs 23, 24 and transmitted as compressed data to an LCD unit 25 for actuating a LCD drive to generate a dot pattern of the video data. At the time, back lights in the LCD unit 25 corresponding to the R, G, and B color components of the compressed data are illuminated on the frame-by-frame basis in synchronization with a timing signal from the timing decoder 22 so that the dot pattern turns to a full color image.

In this embodiment, as writing of the R color component of a given frame into the first RAM 23 takes one frame duration as shown in FIG. 6, the data can be compressed in size by reading the frame of the R color component from the first RAM 23 at an earlier timing. This allows the compressed data to be read out during the blanking period without use of an intricate arrangement.

Accordingly, the combination of the first and second RAMs may be utilized by allowing a step of reading and transferring a frame of the R component which has been written into the first RAM during the preceding frame and simultaneously, writing a frame of the G component into the second RAM to be followed by another step of reading the frame of the G component from the second RAM and simultaneously, writing a frame of the B component into the first RAM which is now unoccupied and a further step of reading and transferring the frame of the B component from the first RAM and simultaneously, writing a succeeding frame of the R component into the second RAM. By repeating the foregoing steps, the R, G, and B components can be shifted from one to another at higher efficiency.

FIGS. 7 to 10 illustrate a further embodiment of the color panel display according to the present invention. This embodiment is distinguished from the previous embodiments by the fact that a reset signal generator is added to the arrangement shown in FIGS. 1 to 4 or FIGS. 5 and 6 for advancing the orientating movement of the liquid crystal in the LCD panel by means of a reset action. The arrangement similar to that shown in FIGS. 1 to 4 provided with the reset signal generator denoted by 30 in FIG. 7 will be explained. The reset action is to return a pixel region to its original state or opaque condition.

Figure 8:
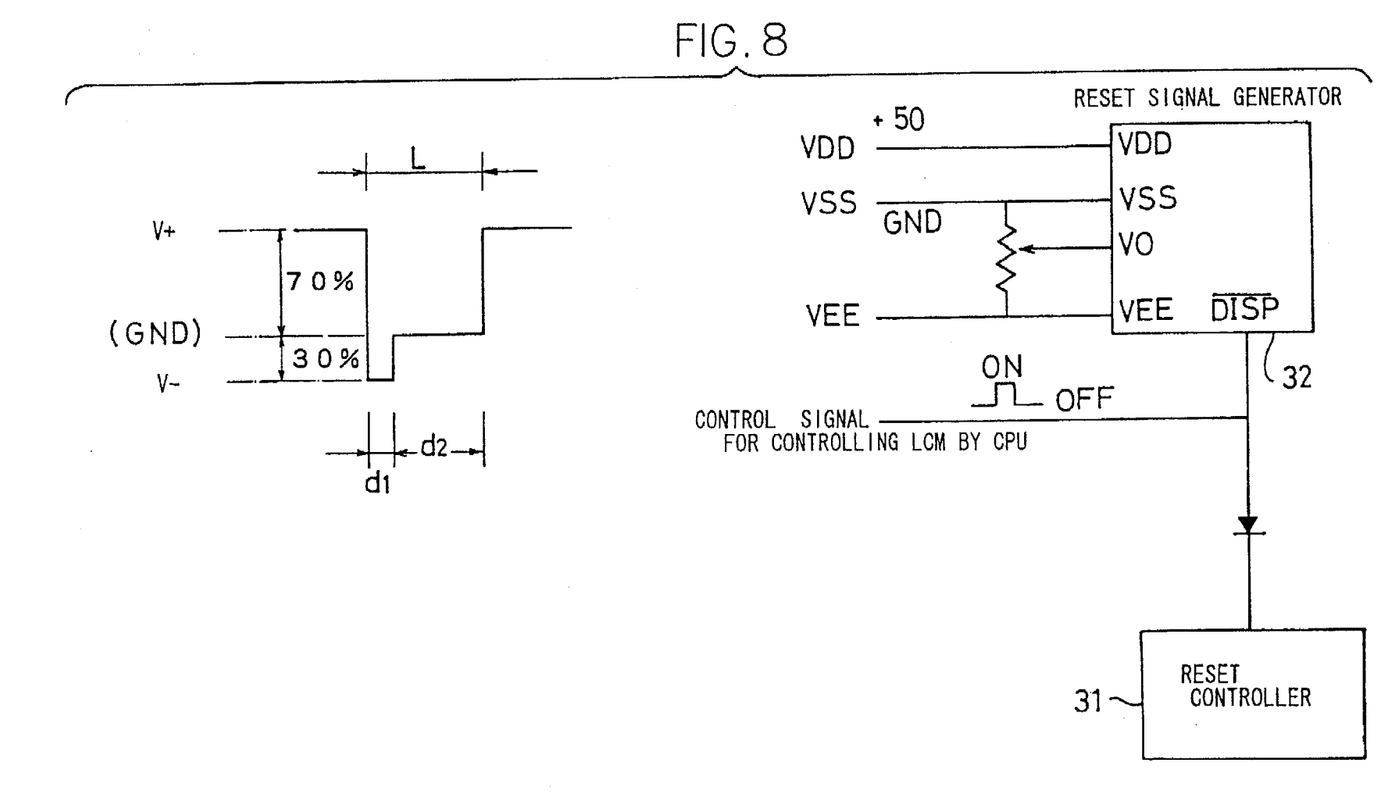
FIG. 8 is a circuitry diagram of the reset signal generator.

The reset action is triggered by the action of the reset signal generator 30 shown in FIG. 8. The reset signal generator 30 comprises a reset control circuit 31 and a reset signal generator circuit 32. In action, the reset signal generator 30 produces and delivers a reset signal to the LCD driver 6 shown in FIG. 2. The waveform of the reset signal shown in FIG. 8 indicates that a potential from the GND level to the plus peak holds 70% of the magnitude and a potential from the GND to the minus peak holds 30%. Also, the reset period L is composed of a minus voltage component d1 of 10 1 to 1 msec and a zero voltage component d2 of 5 msec. The reset action is advanced by the minus voltage component d1. The minus voltage component d1 is set to a desired duration and may be equal to 0.

Figure 9:
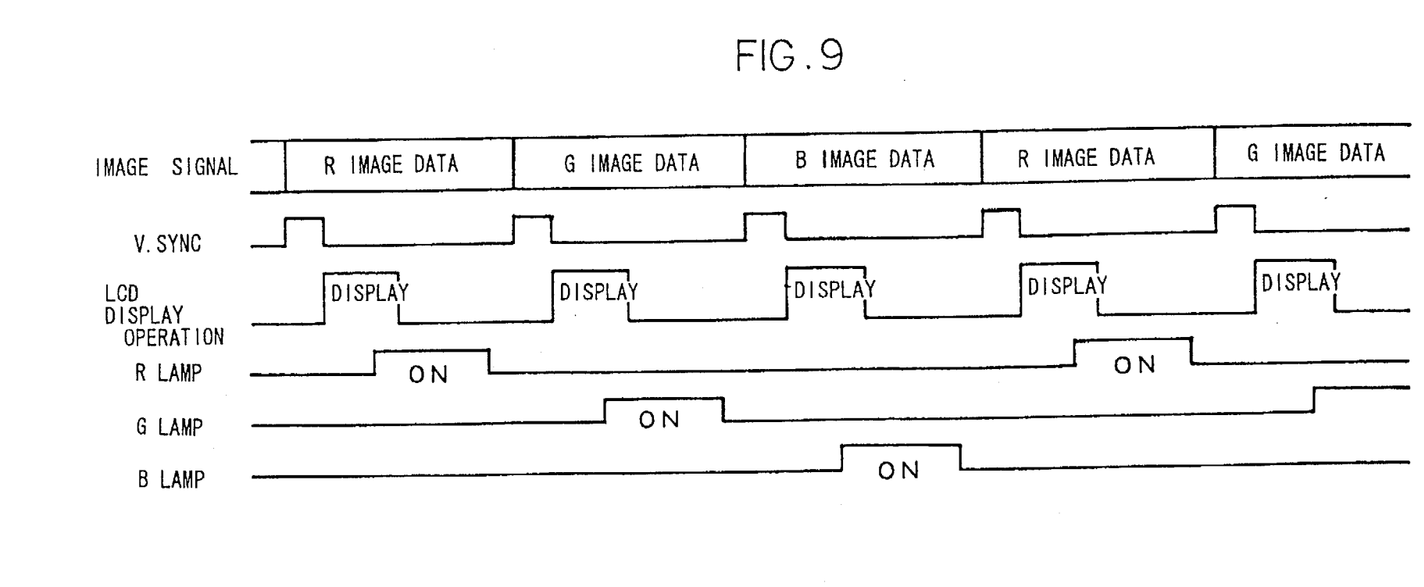
FIG. 9 is a timing chart showing timing actions for display in the color panel display device with the reset signal generator.
Figure 10:
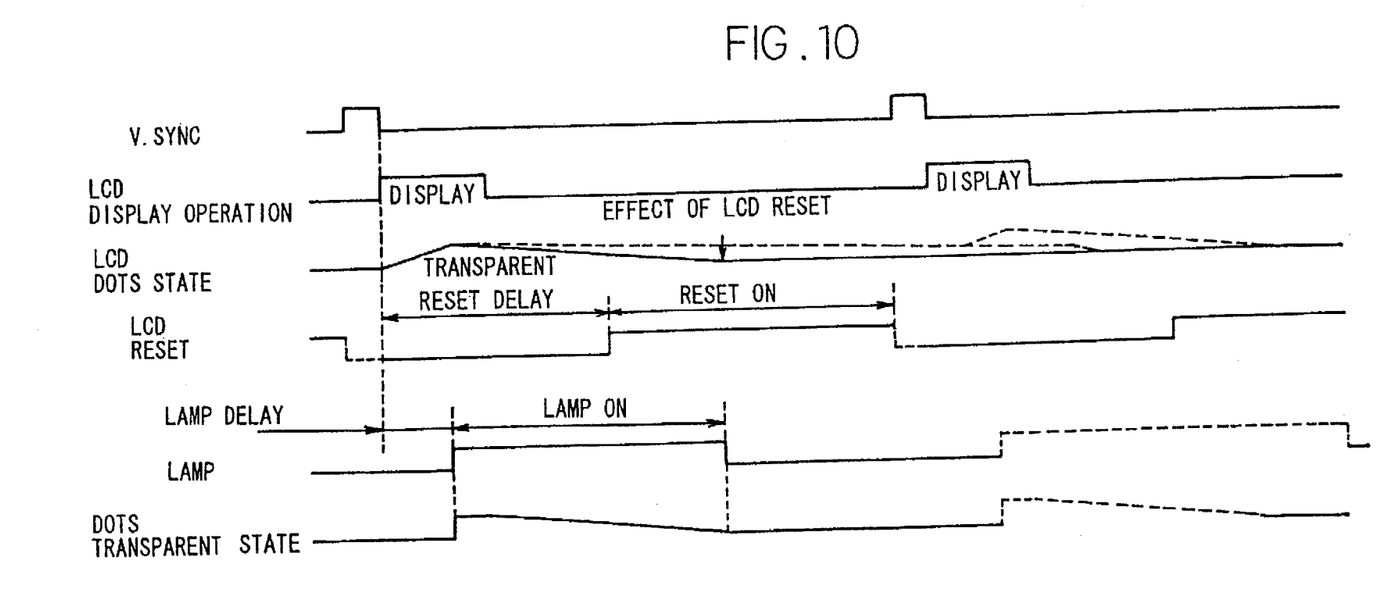
FIG. 10 is a timing chart showing more detailed timing actions in the color panel display device with the reset signal generator.

The action of the reset signal generator 30 shown in FIG. 8 will now be described referring to FIGS. 9 and 10. FIGS. 9 and 10 illustrate timing charts for actuating one single dot of the LCD panel.

Figure 7:
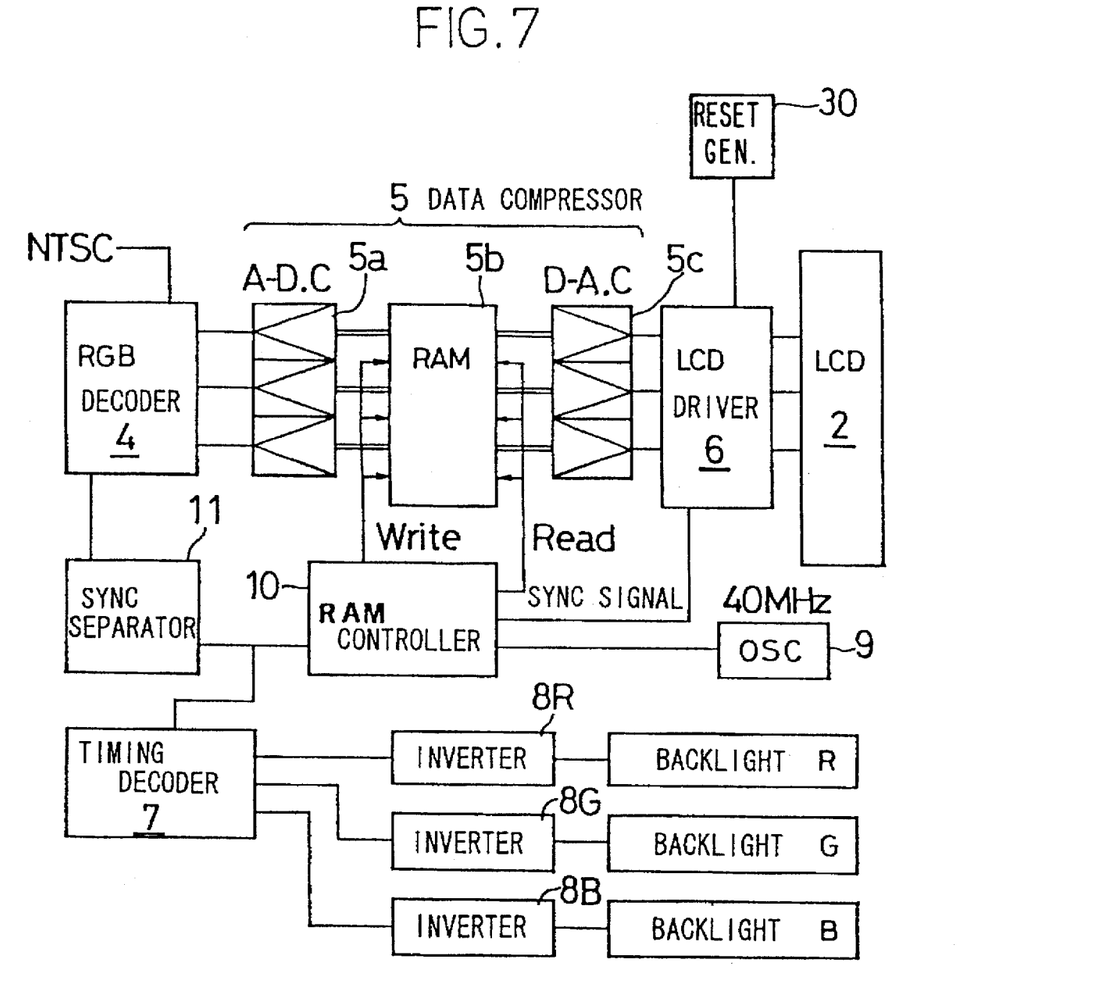
FIG. 7 is a circuitry diagram of a further embodiment showing the color panel display device of FIG. 2 equipped with a reset signal generator.

A composite signal of video data, e.g. a television signal, is separated by the RGB decoder 4 into three, R, G, and B, color components. The three color components are A/D converted by the A/D converter 5a and stored in succession on a frame-by-frame basis (one frame, 16 ms) into the RAM 5b in synchronization with the V-SYNC signal. A series of the R, G, and B components are read from the RAM 5b by the timing of the V-SYNC signal, D/A converted by the D/A converter 5c, and transmitted to the LCD driver 6 for reproducing a dot pattern of the video data on the LCD panel.

The above action will be explained in more details referring to the timing charts of FIG. 10. For example, one frame of the R color component is separated from the R, G, and B color composite signal by the timing synchronous with the V-SYNC signal and stored in the RAM 5b. As the R light source 3R is energized by the timing synchronous with the transmission of the R component as a compressed data to the LCD driver 6, the readout duration of the compressed data is used as a blanking period and the remaining duration is assigned as a hold period. While a dot pattern of the image produced on the display panel during the blanking period is canceled by the LCD-R-END signal, a group of transparent dots on the display panel determined by the R component are not sharply declined but maintained by the memory effect of the liquid crystal material and simultaneously, illuminated by the R light source for display. As denoted by the dotted line of an LCD DOT signal in FIG. 10, the transparent dots remain persistent when the reset action is not involved, causing undesired artifacts of color blur and persistence. When the reset action of this embodiment is introduced, the shift to other color components becomes fast as denoted by the real line of the LCD DOT signal in FIG. 10, minimizing the color blur and persistence. More particularly, as the reset action is triggered after a delay of time from the start of shifting the liquid crystal to its transparent state or at an intermediate during decaying of the transparent state of the liquid crystal, the liquid crystal can quickly be shifted from the transparent state to the opaque state. Accordingly, the reset action of the reset signal generator 30 allows the transparent state of the liquid crystal to have completely been decayed at the next frame period where a frame of the G component is accessed. As the LCD panel is quickly shifted from one state to the other in response to the signal change, its action throughout the frames becomes stable.

Although the color panel display device of the present invention has been described with reference to an LCD construction, it is not limited to the above embodiments. It would be understood that the present invention is applicable to any other flat-panel type displays including the magnetic fluid displays invented by us and disclosed in Japanese Patent Applications No.5-191787 (1993) and No.5-270063 (1993). Although the three color backlight sources are separately illuminated one by one in a sequence of the frames, they may be turned off in the blanking period which is used for transmission of the compressed data of each color component. This will prevent a mixture of colors between any two neighbor pixels. The advantages of the present invention shall be achieved in any of the embodiments by adjusting the illuminating period, blanking time, and timing of illumination to optimum lengths relative to the response speed of the display panel.

As set forth above, the color panel display device of the present invention does not require sets of three different pixels assigned to the three primary colors and thus has a concentration of pixels three times greater than that of any conventional filter type color panel display, whereby a color image can be reproduced at a higher resolution. Also, while the pixel density remains unchanged, the number of pixel drivers will be reduced to ⅓ as compared with the conventional type. Furthermore, the display device of the present invention has no color filter and can thus have its screen panel increased in the light transparency. The three color backlight sources are separately adjustable by the intensity of illumination allowing the color balance control, which is hardly feasible in the conventional color filter type, to be carried out with much ease.

The color panel display device of the present invention has the prescribed advantages as compared with the conventional color filter type displays and in action, performs a sequence of actions of compressing the data of color components of a composite signal on the frame-by-frame basis, allocating the compressed data to a pattern of dots on the display panel during the blanking period, and actuating illumination of the backlight sources in synchronization with the allocating action while the memory effect of the liquid crystal prevents the dot pattern from decaying sharply. Accordingly, as the production of color blur and persistence caused by a mixture of colors between neighbor pixels and attributed to the traditional three-color backlight type panel display is minimized, a clear full-color image can be reproduced.

I claim:

1. In a display apparatus having a display provided with an array of pixels arranged variable in transparency according to a video data and three backlight sources responsive to the video data for turning on and off individually, a color panel display device comprising:

video data converting means for converting the video data on a frame-by-frame basis to a serial data of three color components;

memory means for storing the three components of the serial data separately;

data compressing means for compressing the three components of the serial data upon reading from the memory means;

data bus means for transmitting the three components of compressed data form in a succession of the frames to produce a pixel pattern on the pixel array; and control means for controlling the turning on and off of three backlight sources in accordance with the pixel pattern of the compressed data.

2. A color panel display device according to claim 1, further comprising reset means for shortening a hold duration of the pixel pattern.

3. A color panel display device according to claim 2, wherein said reset means is turned to a reset state with a delay of time after the start of holding a transparency of the pixel pattern.

4. A color panel display device according to claim 3, wherein the reset state of said reset means is terminated a given period earlier than the start of holding a transparency of a succeeding pixel pattern.

5. A color panel display device according to claim 3, wherein the reset state of said reset means is terminated just before the introduction of a succeeding vertical sync signal.

6. A color panel display device according to claim 3, wherein said reset means resets all pixels in said display.

7. A color panel display device according to claim 1, wherein the backlight sources are turned on upon the pixel pattern having a maximum transparency.

8. A color panel display device according to claim 1 or 7, wherein each backlight source is turned off a similar predetermined time period earlier than the introduction of a succeeding vertical sync signal which follows the turning on of the respective backlight source.

9. A color panel display device according to claim 1, wherein said data compressing means includes a digital-to-analog converter for converting a respective stored component of the serial data into analog information over a fraction of a frame.

10. A color panel display device according to claim 1, wherein the video data arrives segmented into frames, and the serial data includes data for only one color component for each frame.

11. A color panel display device according to claim 1, wherein the three components are Red, Green, and Blue.

12. A color panel display device according to claim 1, wherein each backlight source is turned on for substantially an entire frame time period.

13. In a display apparatus having a display provided with an array of pixels arranged variable in transparency according to a video data and three backlight sources responsive to the video data for turning on and off individually, a color panel display device comprising:

video data converting means for converting the video data on a frame-by-frame basis to a serial data of three color components;

memory means for storing the three components of the serial data separately;

data bus means for reading the three components of the serial data from the memory means at a faster speed than a speed of writing the same into the memory means and transmitting them in a succession of the frames to produce a pixel pattern on the pixel array; and control means for controlling the turning on and off of three backlight sources in accordance with the pixel pattern of the transmitted data.

14. A color panel display device according to claim 1 or 13, further comprising sampling means for sampling the three components of the serial data on the frame-by-frame basis so that the three frames of their respective color components of the serial data do not overlap one another on a time base when being stored in the memory means.

15. A color panel display device according to claim 1 or 13, wherein said memory means includes a first memory and a second memory, wherein consecutive frames of the serial data of the three color components are stored alternately by said video data converting means into said first and second memories.

16. A color panel display device according to claim 15 wherein the frame of a first color component is read from one of said first and second memories at the same time that the frame of a second color component is being written to the other of said first and second memories.

17. A color panel display device according to claim 16, wherein a frame of the video data for a first color is written to said memory means over a full frame time period, and further wherein said data bus means reads the frame of video data of the first color over a fraction of the full frame time period.

18. A color panel display device according to claim 16, wherein the frame of the first color component is read out immediately after being stored in the one memory.

19. A color panel display device according to claim 15, wherein said first and second memories are distinct RAMs.

20. A color panel display device according to claim 13, wherein the three components are Red, Green, and Blue.

21. A color panel display device according to claim 13, wherein a frame of the video data for a first color is written to said memory means over a full frame time period, and further wherein said data bus means reads the frame of video data of the first color over a fraction of the full frame time period.

22. A color panel display device according to claim 13, wherein the video data is segmented into frames, and the serial data includes data for only one color component for each frame.

* * * * *